(12) United States Patent
Littrell et al.

(10) Patent No.: US 6,250,489 B1
(45) Date of Patent: Jun. 26, 2001

(54) SECTIONAL JUNCTION BOX

(75) Inventors: Gary L. Littrell, Inverness, IL (US); John C. Saxon, Memphis, TN (US)

(73) Assignee: Thomas & Betts International, Inc. (DE), Sparks, NE (US)

( * ) Notice: Subject to any disclaimer, the term of this patent is extended or adjusted under 35 U.S.C. 154(b) by 0 days.

(21) Appl. No.: 09/159,216

(22) Filed: Sep. 23, 1998

(51) Int. Cl.[7] ................................................. H02G 3/08
(52) U.S. Cl. ......................................... 220/3.8; 220/3.3
(58) Field of Search ............................ 220/3.3, 3.4, 3.8, 220/3.94, 4.02, 501, 503, 555; 174/48, 49, 50, 50.6

(56) References Cited

U.S. PATENT DOCUMENTS

| | | | |
|---|---|---|---|
| 1,396,434 | * 11/1921 | Horton . | |
| 1,925,849 | * 9/1933 | Sharp . | |
| 2,046,351 | 7/1936 | Walker | 247/15 |
| 2,741,117 | 4/1956 | Hoseason | 72/16 |
| 2,930,504 | * 3/1960 | Hudson . | |
| 3,471,629 | * 10/1969 | O'Leary . | |
| 3,565,276 | 2/1971 | O'Brian et al. | 220/3.3 |
| 3,592,956 | * 7/1971 | Fork | 174/49 |
| 3,844,440 | 10/1974 | Hadfield et al. | 220/3.7 |
| 3,864,883 | 2/1975 | McMarlin | 52/221 |
| 3,955,836 | 5/1976 | Traupe | 285/208 |
| 4,040,755 | 8/1977 | Jorgensen et al. | 403/205 |
| 4,496,067 | 1/1985 | Benscoter | 220/3.7 |
| 4,922,672 | 5/1990 | Bartee et al. | 52/221 |

OTHER PUBLICATIONS

Pamphlet: Panduit Pan–Way Twin–70 Tee Fitting; Installation Instructions; Part Nuamber T702T 3 pages; Panduit Raceway Systems Div., 17301 Ridgeland Ave., Tinley Park IL 60477.

* cited by examiner

*Primary Examiner*—Stephen Castellano
(74) *Attorney, Agent, or Firm*—G. Andrew Barger

(57) ABSTRACT

A junction box for routing at least one power wire and at least one data wire through a duct system. The junction box includes a bottom wall, a side wall bounding the bottom wall, and a cover member spaced apart from the bottom wall and supported by the side wall. A first access port is disposed in the cover member and a second access port is disposed in the cover member and adjacent the first access port. A first access region receives the data wire and is disposed below the first access port. A second access region receives the power wire and is disposed below the second access port and is adjacent the first access region. The first access region is sectioned from the second access region such that the power wire is inaccessible from the first access region and the data wire is inaccessible from the second access region.

28 Claims, 8 Drawing Sheets

SECTIONAL JUNCTION BOX

FIELD OF THE INVENTION

The present invention relates to junction boxes and in particular, the present invention relates to a sectional junction box, for routing electric wires, of a strengthened modular design which, when assembled, at all times sections off low and high voltage wires running therethrough.

BACKGROUND

Typical junction boxes are constructed of many different parts and therefore difficult to assemble and install. Low voltage data wires and high voltage power wires are often run through these duct systems and rerouted to various parts of a particular facility. Commonly, shielding conduit or deep groves are required in ducts connecting to the junction boxes to keep the low and high voltage wires from touching, thereby preventing EMF interference between the wires. This type of duct system is costly to manufacture. In addition, duct systems that route the wires in separate vent passageways do not provide closed passageway integrity once the wires enter the junction box thereby resulting in possible EMF interference. Moreover, these types of junction boxes of typically have only one large access port disposed in the top, which makes box structurally weak. These types of junction boxes also do not section off the data wires from the power wires when the access port is open, which may undesirably expose a technician repairing the low voltage data wires to the high voltage power wire.

SUMMARY OF THE INVENTION

The present invention eliminates the above difficulties and disadvantages by providing a junction box for routing at least one power wire and at least one data wire through a cell duct. The junction box includes a bottom wall, a side wall bounding the bottom wall, and a cover member spaced apart from the bottom wall and supported by the side wall. First and second access ports are adjacently disposed in the cover member. A first access region receives the data wire and is disposed below the first access port. A second access region receives the data wire, is disposed below the second access port, and is adjacent the first access region. The first access region is sectioned from the second access region such that the power wire is inaccessible from the first access region and the data wire is inaccessible from the second access region when the first and second access ports are open.

Preferably, a separator wall is integrally formed with the bottom wall and a splitter wall is integrally formed with the separator wall and is in contact with the bottom wall. Also preferably, the splitter wall is perpendicular to the separator wall. Advantageously, the first access region is further defined by the bottom wall, the separator wall, the splitter wall, the side wall, and the cover member, while the second access region is further defined by the bottom wall, the separator wall, the splitter wall, the side wall, and the cover member.

It is also preferred that the data wire, once received in the first access region, can be fed forward and at two opposing right angles without coming in contact with the power wire. Moreover, the power wire, once received in the second access region, can be fed forward and at two opposing right angles without coming in contact with the data wire.

In accordance with one aspect of the invention, the junction box further includes a first ramp, adjacent the first access region, for receiving the data wire thereover when fed from the first access region, a power passageway extending through the first ramp for receiving the power wire thereunder when fed from the second access region, a second ramp, adjacent the second access region, for receiving the power wire thereover when fed from the second access region, and a data passageway extending through the second ramp for feeding the data wire thereunder when fed to the second access region. Also advantageously, the separator wall is disposed between the first access region, the first ramp, and the power passageway, and the second access region, the second ramp, and the data passageway.

Preferably, the power passageway and the data passageway are angled such that the power wire and the data wire, respectively, do not become lodged therein when fed therethrough. It is also desirable that the separator wall includes a first opening wherein the data wire is fed therethrough into the first access region. It is further desirable that the separator wall includes a second opening wherein the at least one power wire is fed through the second opening into the power passageway from the second access region.

One advantage is that the junction box is of two piece construction wherein the bottom wall, the side wall bounding the bottom wall, the splitter wall, and the separator wall are integrally formed, and the cover member is supported by a ledge formed on the side wall. Another advantage is that the side wall includes at least one internally threaded conduit port integrally formed therewith for securing a conduit to the junction box. Still another advantage is that the ledge and the cover member seal the junction box such that downward forces applied to the cover member are distributed to the ledge.

DETAILED DESCRIPTION OF THE PREFERRED EMBODIMENT(S)

Figure 1:
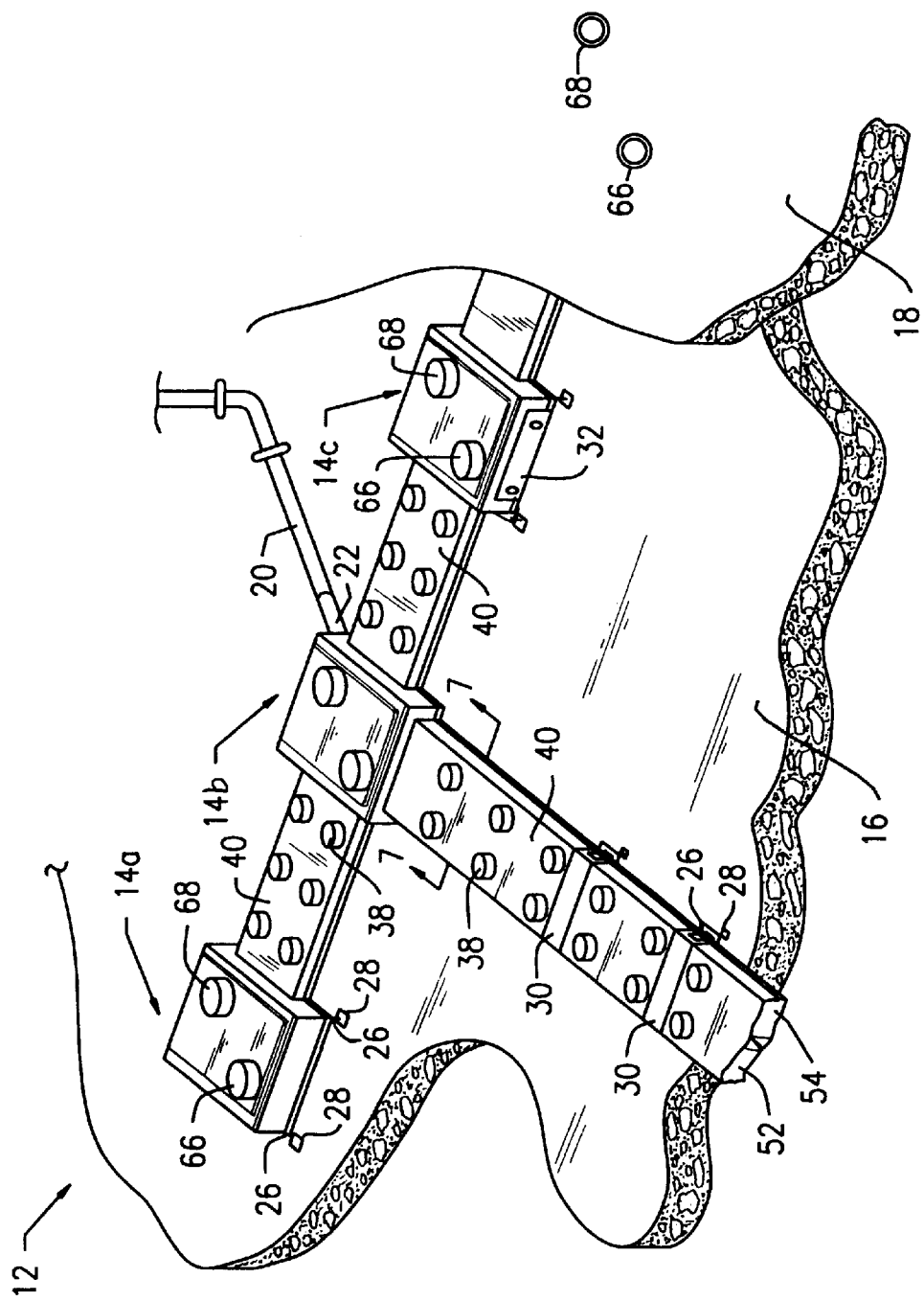
FIG. 1 is a perspective view of a duct system.
Figure 3:
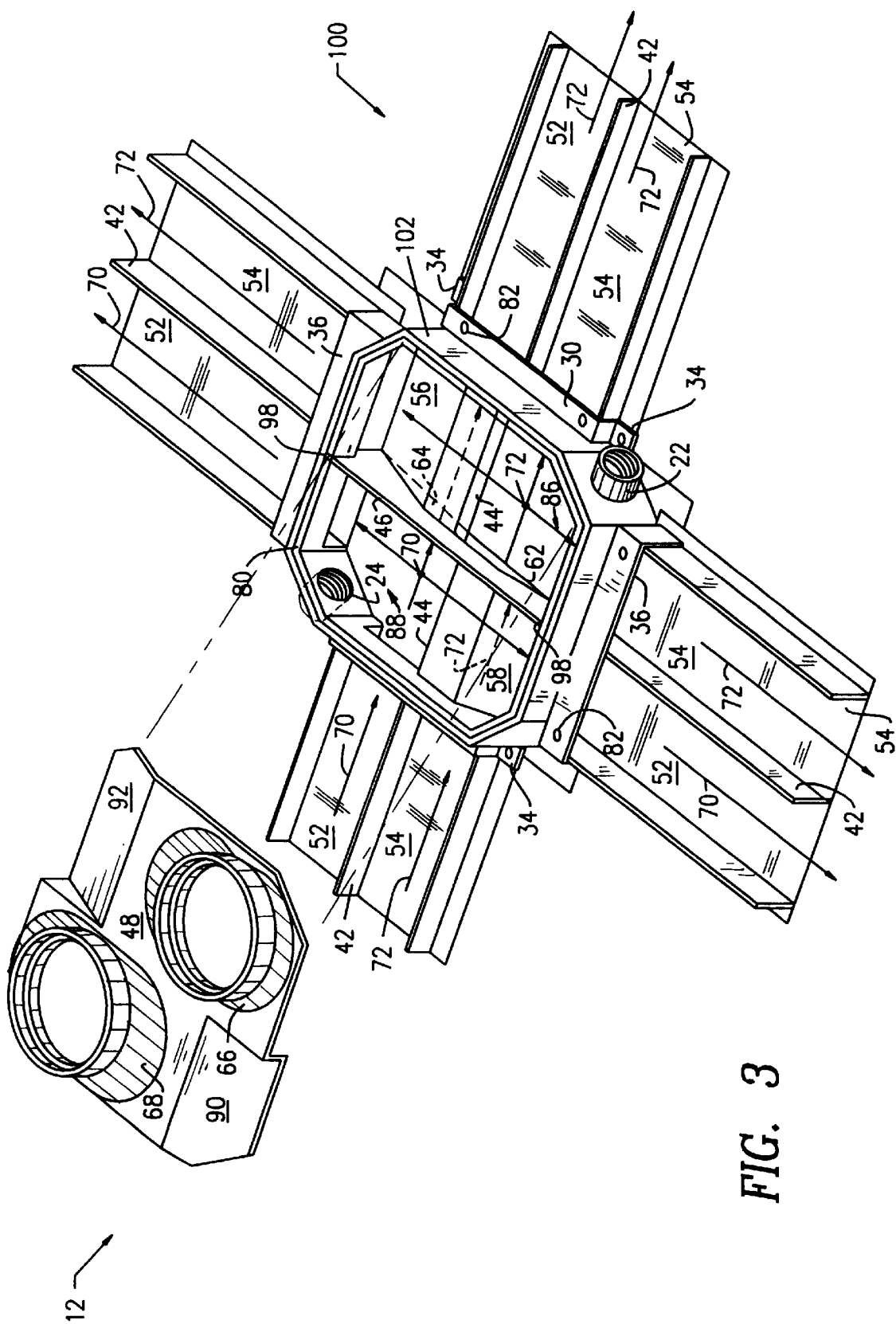
FIG. 3 is a perspective view of the junction box of the present invention with a cover member exploded away.

The above and other features, aspects, and advantages of the present invention will now be discussed in the following detailed description and appended claims, which are to be considered in conjunction with the accompanying drawings in which identical reference characters designate like elements throughout the views. Shown in FIG. 1 is a duct system 12 that has a plurality of junction boxes 14a, 14b, and 14c, associated therewith. The duct system 12 is preferably constructed of fourteen gauge, galvanized steel, supplied in ten foot lengths, which meets or exceeds UL 884 specifications, and is manufactured by the Thomas & Betts Corporation having a principal place of business in Memphis, Tenn. As shown in FIGS. 1, 3, 7, and 8, cell ducts 40 of the system have one or more wireways wherein at least one wire is run. In particular, the cell ducts 40 include a first wireway 52 that preferably contains at least one power wire 70 and a second wireway 54 that preferably contains at least one data wire 72. Because the power wire 70 contains a flow of electricity at a high voltage level (50 or more volts) and the data wire 72 contains a flow of electricity at a relatively low voltage level (5 or less volts), the wires must be separated to reduce EMF interference and possible safety concerns. Therefore, a divider 42 extends between, and separates, the first wireway 52 and the second wireway 54 in the cell ducts 40, as is best shown in FIG. 3. It is further understood that many separated wireways could be contained in the cell ducts 40 and contain such wire as twisted pair wire, fiberoptic wire, co-axial cable, and other wire required in modern businesses.

The duct system 12 contacts, and is constructed on, a primer floor 16 of concrete or other strong substance for support. Raisable legs 26 are attached to the cell ducts 40 and are fitted to a coupler 30 at spaced apart lengths. The raisable legs 26 are mounted on a base 28, which contacts the primer floor 16. The raisable legs 26 are also preferably attached to the junction boxes 14a, 14b, and 14c, for vertical height adjustment as will be discussed in greater detail below.

Once the duct system 12 is installed on the primer floor 16, a finished floor 18 of usually concrete or hard rubber is poured over the system 12 and a layer of carpeting or tile is adhesively placed over the finished floor 18. Each of the junction boxes 14a, 14b, and 14c, has a first access port 66 and a second access port 68 diagonally adjacent from the first access port 66 for gaining access to the interior of the junction boxes 14a, 14b, and 14c, once the finished floor 18 has been poured. As shown in FIGS. 1, 2, 4, and 8, a preset shaft 38 is mounted in each cell duct 40 for each wireway such that the wires running therethrough can be accessed prior to the finished floor 18 being poured and a lateral of the wire can be run. The cell ducts 40 connect the plurality of junction boxes 14a, 14b, and 14c. An end cap 32 is used for sealing in one of the junction boxes 14a, 14b, and 14c, as shown in FIG. 1, when one of the cell ducts 40 is not connected to one of the sides.

Figure 2:
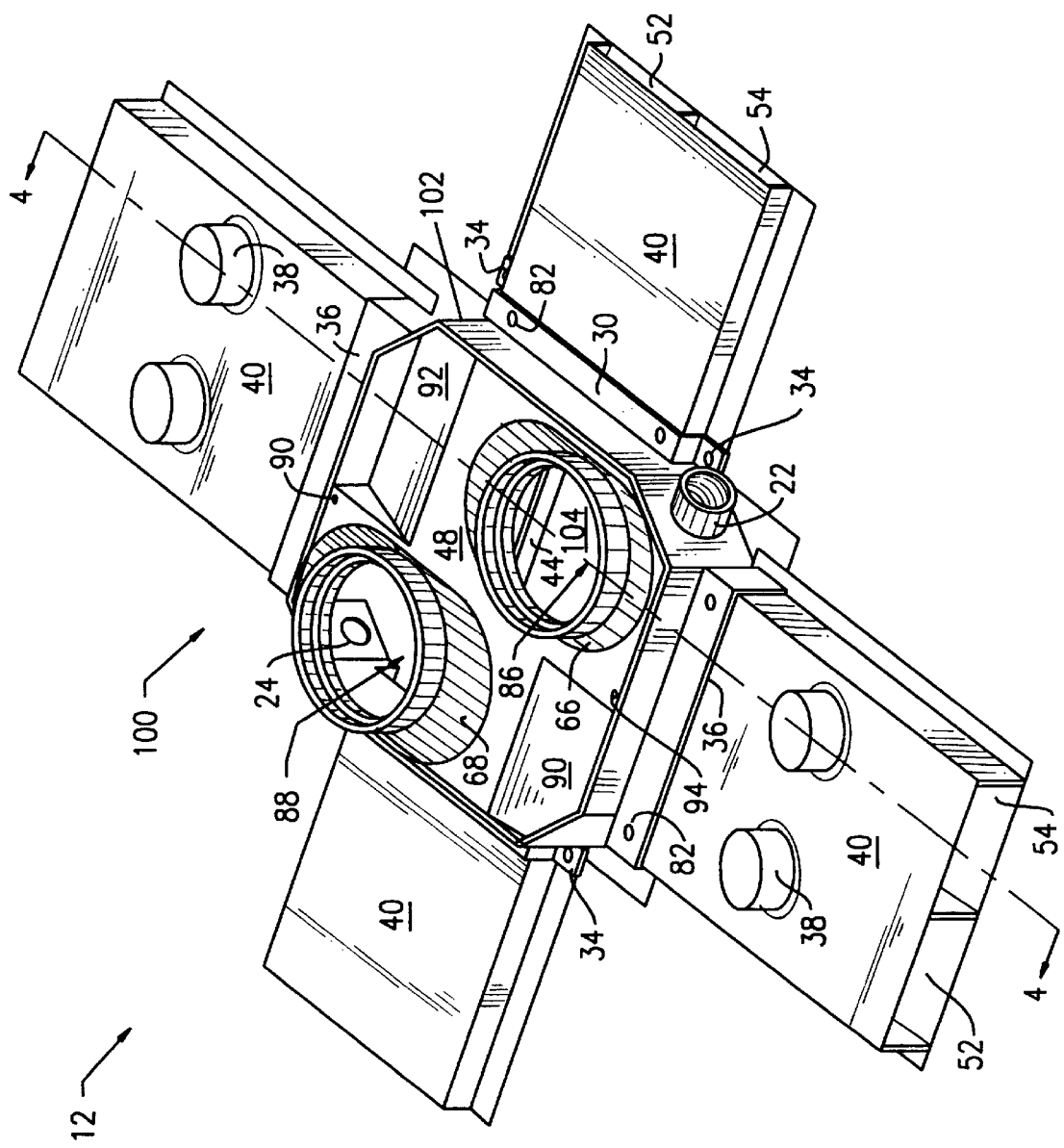
FIG. 2 is a perspective view of a junction box of the present invention.

Referring now to FIG. 3, a junction box 100 of the present invention and of the type included in the duct system 12 is shown for routing the at least one power wire 70 and the at least one data wire 72 through the duct system 12 in a main feed. The junction box 100 is preferably constructed of galvanized steel and includes a bottom wall 104, a side wall 102 bounding the bottom wall 104 for receiving a conduit 20 therein and which is shown in FIG. 1 for providing a power wire 70 feed to the junction box 100. As best shown in FIGS. 2, and 3, a coupler 30 is preferably included on two sides of the junction box 100 having two apertures 34 disposed therein for receiving the raisable legs 26 such that the height of the junction box 100 is adjustable. Each coupler 30 further has attachment apertures 82 disposed therein for receiving a device therethrough, such as a bolt or screw, to couple the cell duct 40 to the junction box 100. A guide flange 36 is integrally formed on two sides of the junction box 100 adjacent the two sides having the coupler 30, which also has attachment apertures 82 disposed therein for receiving a device therethrough, such as a bolt or screw, to couple the cell duct 40 to the junction box 100.

A cover member 48 is spaced apart from the bottom wall 104 and supported by the side wall 102. Preferably, the side wall 102 includes a ledge 80 (FIGS. 3, 4, and 6) that is integrally formed therewith and on which the cover member 48 is releasably supported prior to the finished floor 18 being poured. The ledge 80 and the cover member 48 seal the junction box 100 such that the finished floor 18 does not enter the interior of the junction box 100 when poured. The cover member 48 is releasably fastened to the side wall 102 via cover apertures 94, which are axially aligned with threaded bores 98 for receiving a device therethrough, such as a bolt or screw, to couple the cover member 48 to the junction box 100.

Figure 9:
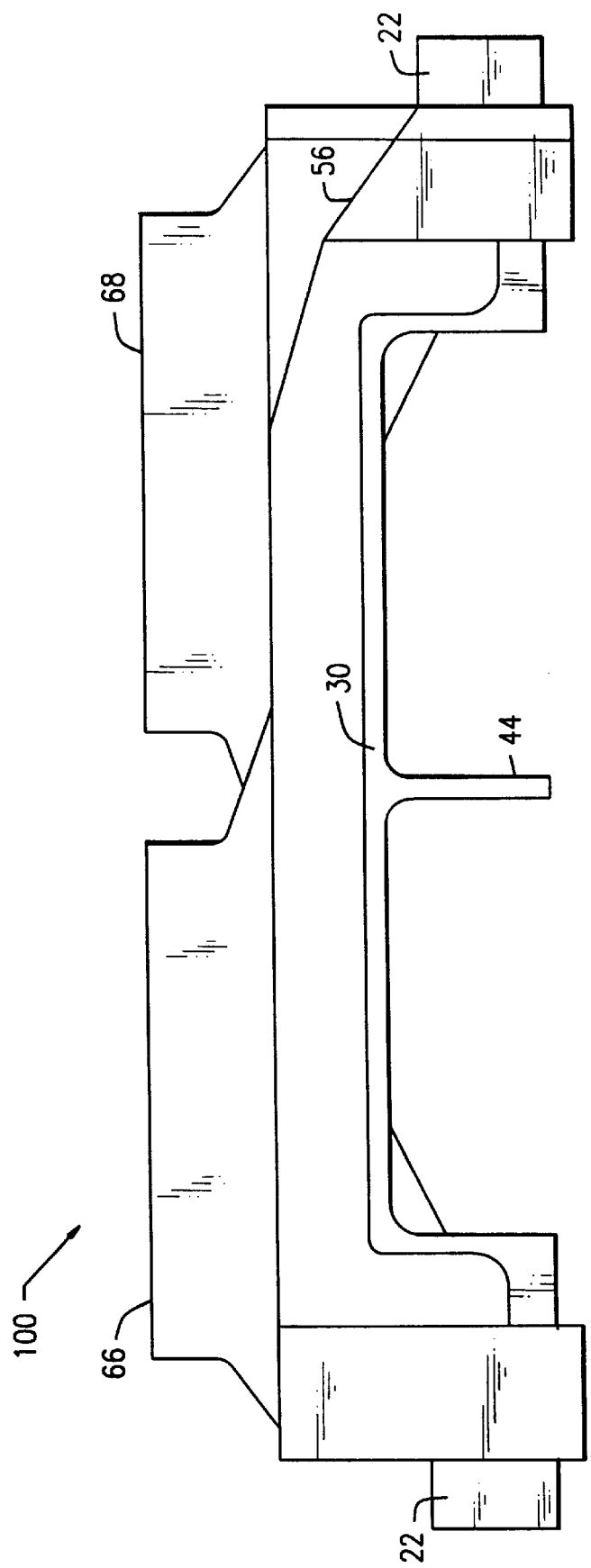
FIG. 9 is a side elevational view of the junction box of the present invention.

When downward forces are applied to the cover member 48, such as when a coin cart is rolled over the junction box 100, the forces are distributed to the ledge 80. This allows the present junction box 100 to withstand a great deal of force applied thereto and provides for a very sturdy overall construction, protecting the wires therein. The side wall 102 further includes at least one conduit port 22 integrally formed therewith for securing the conduit 20 to the junction box 100, as shown in FIG. 1. The conduit port 22 is internally threaded, as shown in FIGS. 2, 3, and 9, for receiving a threaded end of the conduit 20 therein. Preferably, the junction box 100 has two conduit ports integrally formed therewith and disposed at diagonally opposing corners. An opening 24 is it contained in each of the conduit ports for introducing the wire fed from the conduit 20 into the junction box 100.

Preferably, the data wire 72 is fed from the conduit 20 into a first access region 86 of the junction box 100, via the conduit port 22, which receives the data wire 72 fed from the cell duct 40. The first access region 86 is disposed below the first access port 66 and its function will be discussed in greater detail below. Moreover, a second access region 88 is provided in the junction box 100 for receiving the at least one data wire 72 and is disposed below the second access port 68. The second access region 88 is diagonally adjacent the first access region 86.

Figure 4:
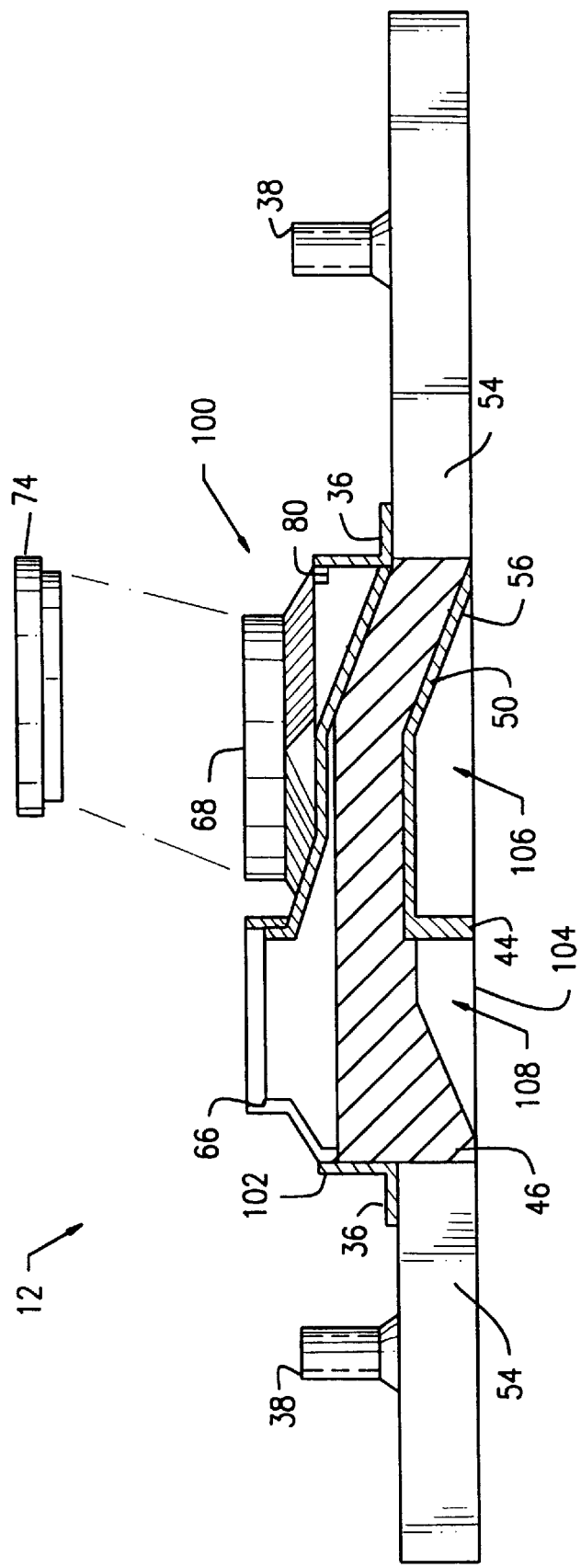
FIG. 4 is a cross sectional view of the junction box of the present invention taken along sight line 4—4 of FIG. 3 with a lid exploded away.
Figure 5:
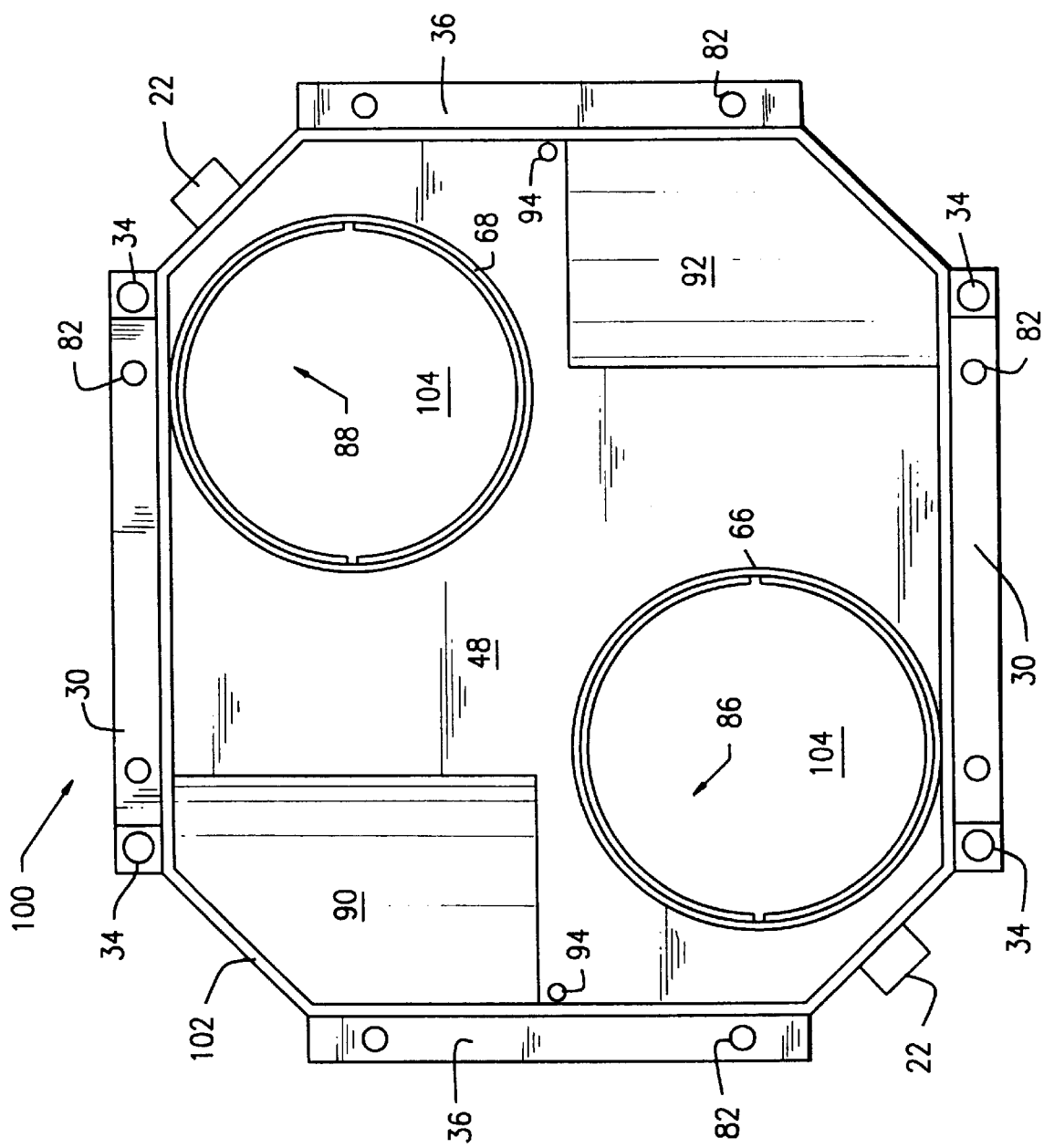
FIG. 5 is a plan view of the junction box of the present invention with the cover member installed therein.

As schematically shown in FIG. 3, once the power wire 70 is received in the second access region 88, it can be fed forward and at two opposing right angles to the side without contacting the data wire 72. This is accomplished by a technician removing a lid 74, as shown in FIG. 4 from the second access port 68, reaching into the junction box 100, and either: feeding one power wire 70 in one of three different directions or splicing the wire and branching the wire three ways so that it can be fed in three different directions. Alternatively, if more than one power wire 70 is fed into the junction box 100 via the first wireway 52 and possibly through the opening 24 of the conduit port 22, then a separate power wire 70 or more can be fed in up to three different directions from the second access region 88.

Similarly, the at least one data wire 72, once received in the first access region 86, can be fed forward and at two opposing right angles without contacting the at least one power wire 70. This is accomplished by a technician accessing the first access port 66, reaching into the junction box 100, and either: feeding one data wire 72 in one of three different directions or splicing the wire and branching the wire three ways so that it can be fed in three different directions. Alternatively, if more than one power wire 70 is fed into the junction box 100 via the first wireway 52 and possibly through the opening 24 of the conduit port 22, then a separate power wire 70 or more is fed in up to three different directions from the second access region 88.

Figure 6:
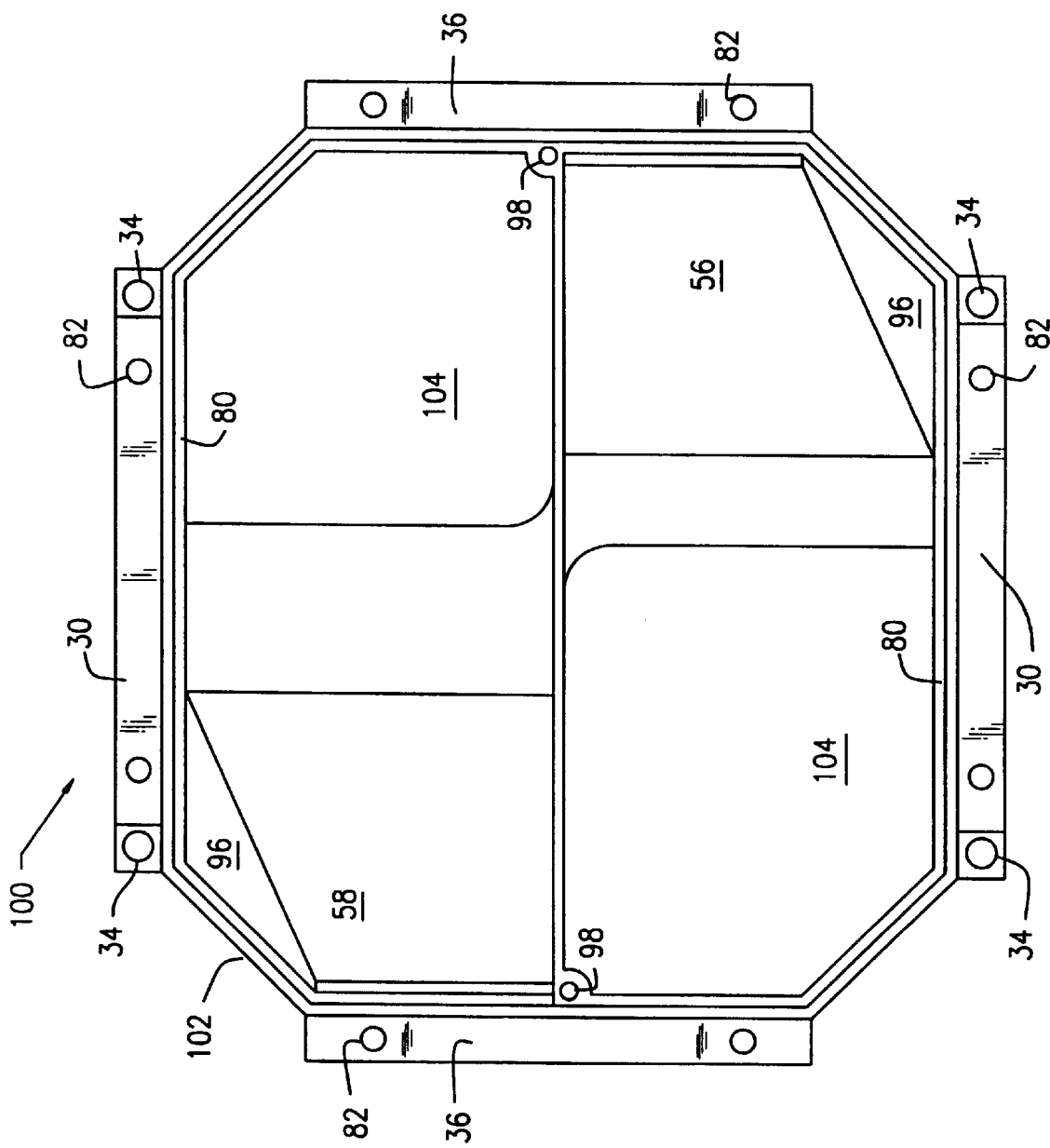
FIG. 6 is a plan view of the junction box of the present invention without the cover member installed therein.
Figure 7:
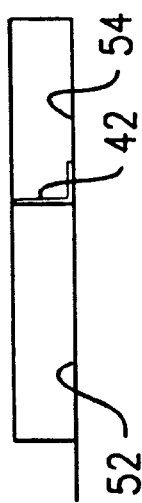
FIG. 7 is a cross sectional view of a duct cell of the duct system taken along sight line 7—7 of FIG. 1.
Figure 8:
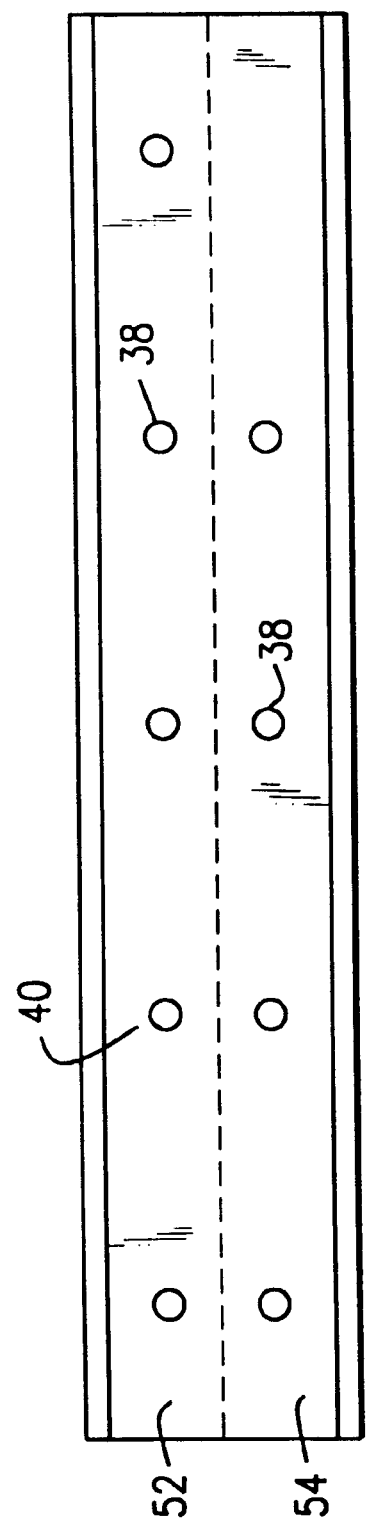
FIG. 8 is a plan view of the duct cell of the duct system.

As shown in FIGS. 3, 4, and 6, a first ramp 56 is adjacent the first access region 86, for receiving the at least one data wire 72 thereover when fed from the first access region 86. A power passageway 106 extends through the first ramp 56 for receiving the at least one power wire 70 fed from the second access region 88, thereby preventing any contact or EMF interference with the data wire 72. The power passageway 106 is preferably angled such that the power wire 70 does not become lodged therein when fed therethrough.

In addition, a second ramp 58 is adjacent the second access region 88 and receives the power wire 70 thereover when fed from the second access region 88. A data passageway 108 extends through the second ramp 58 for feeding the at least one data wire 72 to the second access region 88 thereby preventing any contact or EMF interference from the power wire 70. The data passageway 106 is preferably angled such that the at least one data wire 72 does not become lodged therein when fed therethrough.

As is best shown in FIGS. 3 and 6, a separator wall 46 is provided in the junction box 100 and is integrally formed with the bottom wall 104. The separator wall 46 provides an abutting contact fit with the cover member 48 such that the first access region 86 is quarantined from the second access region 88 resulting in the at least one power wire 70 being inaccessible from the first access region 86 and the at least one data wire 72 being inaccessible from the second access region 88. Thus, when the data wire 72 in the first access region 86 is being accessed by a technician from the first access port 66, there can be no inadvertent access to the second access region 88 that contains the power wire 70. Likewise, when the power wire 70 in the second access region 88 is being accessed by a technician from the second access port 68, there can be no inadvertent access to the first access region 86 which contains the data wire 72.

The separator wall 46 is disposed between the first access region 86, the first ramp 56, and the power passageway 106, and the second access region 88, the second ramp 58, and the data passageway 108, and preferably divides the interior of the junction box 100 in half. The separator wall 46 includes a first opening 62 wherein the at least one data wire 72 is fed therethrough into the first access region 86 and a second opening 64 wherein the at least one power wire 70 is fed therethrough into the power passageway 106 from the second access region 88.

A splitter wall 44 is integrally formed with the separator wall 46 and is in contact with the bottom wall 104. The splitter wall 44 is preferably perpendicular to the separator wall 46 within the interior of the junction box 100 and is divided 42 by the separator wall 46. The splitter wall 44 is formed by the leading edges of the first ramp is 56 and second ramp 58.

The present junction box 100 has a number of features to further aid the feeding of wire therethrough and to prevent the wire from being snagged or caught therein because it is difficult loosen snagged wire caught within a non-accessible portion of the junction box 100 once the finished floor 18 has been poured and the cover member 48 is secured. In particular, the cover member 48 further includes sloped portions 90 and 92 disposed over the first ramp 56 and the second ramp 58 for guiding the at least one data wire 72 and the at least one power wire 70 thereover, respectively. Further, as shown in FIG. 6, slants 96 are provided adjacent the first ramp 56 and the second ramp 58 to urge wire fed down the ramp into the wireways.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above mentioned description is to be considered exemplary, rather than limiting, and the true scope of the invention is that defined in the following claims.

What is claimed is:

1. A junction box for routing a power wire and a data wire, having a bottom wall, a side wall bounding the bottom wall, and a cover member spaced apart from the bottom wall, the junction box comprising:

a first access port disposed in the cover member;

a second access port disposed in the cover member and adjacent the first access port;

a first access region for receiving the data wire disposed below the first access port;

a second access region for receiving the power wire disposed below the second access port;

a separator wall communication with the bottom wall;

a first ramp, adjacent the first access region, for receiving the data wire thereover when fed from the first access region;

a power passageway extending through the first ramp for receiving the power wire fed from the second access region, a second ramp, adjacent the second access region, for receiving the power wire thereover when fed from the second access region;

a data passway extending through the second ramp or feeding the data wire to the second access region; and wherein the first access region is sectioned from the second access region such that the power wire is inaccessible from the first access region and the data wire is inaccessible from the second access region.

2. The junction box of claim 1 further comprising a splitter wall integrally formed with the separator wall and the bottom wall, the splitter wall being perpendicular to the separator wall.

3. The junction box of claim 2 wherein the first access region is further defined by the bottom wall, the separator wall, the splitter wall, at least part of the side wall, and the cover member.

4. The junction box of claim 2 wherein the second access region is further defined by the bottom wall, the separator wall, the splitter wall, at least part of the side wall, and the cover member.

5. The junction box of claim 1 wherein the data wire, once received in the first access region, can be fed forward and at two opposing right angles without contacting the power wire.

6. The junction box of claim 1 wherein the power wire, once received in the second access region, can be fed forward and at two opposing right angles without contacting the data wire.

7. The junction box of claim 1 wherein the separator wall is disposed between the first access region, the first ramp, and the power passageway on one side, and the second access region, the second ramp, and the data passageway on another side.

8. The junction box of claim 7 wherein the separator wall includes a second opening through which the power wire is fed into the power passageway from the second access region.

9. The junction box of claim 8 wherein downward forces applied to the cover member are distributed to the ledge.

10. The junction box of claim 1 wherein the power passageway and the data passageway are angled such that the power wire and the data wire, respectively, do not become lodged therein when fed therethrough.

11. The junction box of claim 1 wherein the separator wall includes a first opening through which the data wire is fed into the first access region.

12. The junction box of claim 1 being of two piece construction wherein the bottom wall, the side wall, the splitter wall, and the separator wall are integrally formed, and the cover member is supported by the side wall.

13. The junction box of claim 1 wherein the side wall includes a ledge integrally formed therewith and on which the cover member is releasably supported.

14. The junction box of claim 1 wherein the side wall includes a conduit port integrally formed therewith for securing a conduit to the junction box.

15. A junction box for routing a power wire and a data wire through a plurality of duct cells each having a divider for separating the power wire and the data wire, the junction box having a bottom wall, a side wall bounding the bottom wall, and a cover member spaced apart from the bottom wall, the junction box comprising:
   a first access port disposed in the cover member;
   a second access port disposed in the cover member and adjacent the first access port;
   a first access region for receiving the data wire disposed below the first access port and wherein the data wire, once received in the first access region, can be fed forward and at two opposing right angles without contacting the power wire;
   a second access region for receiving the power wire disposed below the second access port, wherein the power wire, once received in the second access region, can be fed forward and at two opposing right angles without contacting the data wire;
   a separator wall in communication with the bottom wall;
   a first ramp, adjacent the first access region, for receiving the data wire thereover when fed from the first access region;
   a power passageway extending through the first ramp for receiving the power wire-fed from the second access region;
   a second ramp, adjacent the second access region, for receiving the power wire thereover when fed from the second access region;
   a data passageway extending through the second ramp for feeding the data wire to the second access region; and
   wherein the first access region is sectioned from the second access region such that the power wire is inaccessible from the first access region and the data wire is inaccessible from the second access region.

16. The junction box of claim 15 further comprising a splitter wall integrally formed with the separator wall and in contact with the bottom wall, the splitter wall being perpendicular to the separator wall.

17. The junction box of claim 16 wherein the first access region is further defined by the bottom wall, the separator wall, the splitter wall, at least part of the side wall, and the cover member.

18. The junction box of claim 17 wherein the separator wall is disposed between the first access region, the first ramp, and the power passageway on one side, and the second access region, the second ramp, and the data passageway on another side.

19. The junction box of claim 18 wherein the separator wall includes a second opening wherein the power wire is fed therethrough into the power passageway from the second access region.

20. The junction box of claim 19 wherein downward forces applied to the cover member are distributed to the ledge.

21. The junction box of claim 17 wherein the power passageway and the data passageway are angled such that the power wire and the data wire, respectively, do not become lodged therein when fed therethrough.

22. The junction box of claim 17 wherein the separator wall includes a first opening wherein the data wire is fed therethrough into the first access region.

23. The junction box of claim 16 wherein the second access region is further defined by the bottom wall, the separator wall, the splitter wall, at least part of the side wall, and the cover member.

24. The junction box of claim 15 wherein the junction box is of two piece construction and the bottom wall, the side wall, the splitter wall, and the separator wall are integrally formed, and the cover member is supported by the side wall.

25. The junction box of claim 15 wherein the side wall includes a ledge integrally formed therewith and on which the cover member is releasably supported.

26. The junction box of claim 15 wherein the side wall includes a conduit port integrally formed therewith for securing a conduit to a junction box.

27. A junction box for routing a power wire and a data wire and having a bottom wall, a side wall bounding the bottom wall, and a cover member spaced apart from the bottom wall, the junction box comprising:
   a separator wall integrally formed with the bottom wall;
   the side wall including a ledge integrally formed therewith and on which the cover member is releasably supported, wherein downward forces applied to the cover member are distributed to the ledge, wherein the side wall further includes a conduit port integrally formed therewith for securing the conduit to the junction box;
   a splitter wall integrally formed with the separator wall and in contact with the bottom wall, the splitter wall being perpendicular to the separator wall;
   a first access port disposed in the cover member;
   a second access port disposed in the cover member and diagonally adjacent the first access port;
   a first access region for receiving the data wire disposed below the first access port and wherein the data wire, once received in the first access region, can be fed forward and at two opposing right angles without contacting the power wire;
   a second access region for receiving the power wire disposed below the second access port, the second access region being diagonally adjacent the first access region and wherein the power wire, once received in the second access region, can be fed forward and at two opposing right angles without contacting the data wire;

a first ramp, adjacent the first access region, for receiving the data wire thereover when fed from the first access region;

a power passageway extending through the first ramp for receiving the power wire fed from the second access region, the power passageway being angled such that the power wire does not become lodged therein when fed therethrough;

a second ramp, adjacent the second access region, for receiving the power wire thereover when fed from the second access region;

a data passageway extending through the second ramp for feeding the data wire to the second access region, the data passageway being angled such that the data wire does not become lodged therein when fed therethrough;

a separator wall in contact with the bottom wall and including a first opening wherein the data wire is fed therethrough into the first access region and a second opening wherein the power wire is fed therethrough into the power passageway from the second access region, the separator wall being disposed between the first access region, the first ramp, and the power passageway on one side, and the second access region, the second ramp, and the data passageway on another side; and wherein the first access region is quarantined from the second access region such that the power wire is inaccessible from the first access region and the data wire is inaccessible from the second access region.

28. The junction box of claim 27 wherein the cover member further includes a sloped portion disposed over the first ramp and the second ramp for guiding the data wire and the power wire thereover, respectively.

* * * * *